United States Patent
Coe et al.

(10) Patent No.: US 11,474,013 B2
(45) Date of Patent: *Oct. 18, 2022

(54) ROLLING CYCLIC FATIGUE TEST PLATFORM FOR DETERMINING ASPHALT DUCTILITY

(71) Applicants: William B. Coe, Wrightwood, CA (US); Joshua Coe, San Jose, CA (US)

(72) Inventors: William B. Coe, Wrightwood, CA (US); Joshua Coe, San Jose, CA (US)

(*) Notice: Subject to any disclaimer, the term of this patent is extended or adjusted under 35 U.S.C. 154(b) by 125 days.

This patent is subject to a terminal disclaimer.

(21) Appl. No.: 16/900,729

(22) Filed: Jun. 12, 2020

(65) Prior Publication Data
US 2020/0386660 A1 Dec. 10, 2020

Related U.S. Application Data

(63) Continuation of application No. 16/072,154, filed as application No. PCT/US2017/015190 on Jan. 26, 2017, now Pat. No. 10,718,699.

(60) Provisional application No. 62/288,391, filed on Jan. 28, 2016.

(51) Int. Cl.
*G01N 3/32* (2006.01)
*G01N 3/56* (2006.01)

(52) U.S. Cl.
CPC ................. *G01N 3/32* (2013.01); *G01N 3/56* (2013.01)

(58) Field of Classification Search
CPC ..................................... G01N 3/32; G01N 3/56
See application file for complete search history.

(56) References Cited

U.S. PATENT DOCUMENTS

| | | | |
|---|---|---|---|
| 4,502,327 A | 3/1985 | Scrivener | |
| 5,641,901 A * | 6/1997 | Powell | G01N 3/56 73/146 |
| 5,659,140 A * | 8/1997 | Jakob | G01N 3/56 73/788 |
| 5,987,961 A | 11/1999 | Harris et al. | |
| 6,125,685 A * | 10/2000 | Collier | G01N 3/56 73/146 |
| 6,268,427 B1 | 7/2001 | Wang | |
| 6,526,836 B1 * | 3/2003 | Brouse | G01N 3/10 73/760 |
| 7,614,275 B2 | 11/2009 | Lin et al. | |
| 8,808,445 B2 | 8/2014 | Coe | |
| 8,863,585 B2 | 10/2014 | Wang et al. | |
| 8,926,742 B2 | 1/2015 | Coe | |
| 8,992,118 B2 | 3/2015 | Coe | |
| 9,057,163 B1 | 6/2015 | Coe | |
| 9,074,328 B1 | 7/2015 | Coe | |

(Continued)

*Primary Examiner* — Max H Noori
*Assistant Examiner* — Masoud H Noori
(74) *Attorney, Agent, or Firm* — Knobbe Martens Oson & Bear, LLP

(57) ABSTRACT

A Fatigue Performance Test induces a traffic analogous, 60 cycle, stress-strain environment into a road pavement cross section through a rolling cyclic fatigue platform. Data from the encounter dynamic reveals where strain build-up is occurring well before external, visually detectable evidence of fatigue failure is present in the pavement sample from cracks or permanent deformation. Responsive tuning of the embedded, sensor firmware establishes a baseline status for the sample whereupon incoming data gathered during the stress-strain encounter dynamic reveals details of fatigue build-up.

10 Claims, 7 Drawing Sheets

(56) References Cited

U.S. PATENT DOCUMENTS

| | | |
|---|---|---|
| 9,127,413 B2 | 9/2015 | Coe |
| 9,169,606 B2 | 10/2015 | Coe |
| 9,234,825 B2 * | 1/2016 | Huang .................. G01N 33/42 |
| 9,347,187 B2 | 5/2016 | Coe |
| 9,481,967 B2 | 11/2016 | Coe |
| 9,551,114 B2 | 1/2017 | Coe |
| 9,551,117 B2 | 1/2017 | Coe |
| 9,624,625 B2 | 4/2017 | Coe |
| 9,637,870 B1 | 5/2017 | Coe |
| 10,718,699 B2 | 7/2020 | Coe |
| 2003/0194273 A1 | 10/2003 | Lloyd |
| 2012/0253704 A1 | 10/2012 | Huang et al. |
| 2015/0080504 A1 | 3/2015 | Coe |
| 2019/0017233 A1 | 1/2019 | Coe |
| 2019/0040258 A1 | 2/2019 | Coe |
| 2019/0055383 A1 | 2/2019 | Coe |

\* cited by examiner

ROLLING CYCLIC FATIGUE TEST PLATFORM FOR DETERMINING ASPHALT DUCTILITY

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 16/072,154, filed Jul. 23, 2018, which is the national stage in the United States of PCT International Application No. PCT/US2017/015190, filed Jan. 26, 2017, which claims the benefit of U.S. Provisional Application No. 62/288,391, filed Jan. 28, 2016. The aforementioned application is incorporated by reference herein in its entirety, and is hereby expressly made a part of this specification.

FIELD OF THE INVENTION

A Fatigue Performance Test induces a traffic analogous, 60 cycle, stress-strain environment into a road pavement cross section through a rolling cyclic fatigue platform. Data from the encounter dynamic reveals where strain build-up is occurring well before external, visually detectable evidence of fatigue failure is present in the pavement sample from cracks or permanent deformation. Responsive tuning of the embedded, sensor firmware establishes a baseline status for the sample whereupon incoming data gathered during the stress-strain encounter dynamic reveals details of fatigue build-up.

BACKGROUND OF THE INVENTION

Repair and maintenance of the civil infrastructure, including roads and highways of the United States present great technical and financial challenges. The American Association of State Highway Transportation Officials (AASHTO) issued a bottom line report in 2010 stating that $160 billion a year must be spent to maintain infrastructure; however, only about $80 billion is being spent. The result is a rapidly failing infrastructure. New methods of maintaining existing roads and new methods of constructing roads that would extend the useful life for the same budget dollar are needed to meet the challenges of addressing our failing infrastructure.

In the United States alone there are approximately 4.4 million center lane miles of asphalt concrete, with a center lane comprising a 24 foot wide pavement surface having a lane in each direction. Asphalt concrete paving surfaces are typically prepared by heating aggregate to 400° F., and applying liquid asphalt (e.g., by spraying into a pug mill or drum coating) to yield a mixture of 95% aggregate and 5% asphalt. If a temperature of approximately 350° F. is maintained for the mixture, it is considered hot mix asphalt and does not stick to itself as long as the temperature is maintained. The hot mix asphalt is typically placed in a transfer truck, which hauls it to the job site, where it is placed on either a gravel road base or onto an old road surface that has been previously primed. A paving apparatus receives the hot mix asphalt from the transfer truck and spreads it out uniformly across the base surface, and as the material progressively cools below 250° F. degrees it is compacted with a roller. The hot mix asphalt is rolled to a uniform density, and after approximately one to three days of cooling and aging the surface can be opened to traffic.

After such asphalt pavement has been in place for several years, the pavement progressively ages. Water works its way into the pavement. It begins to lose its integrity on the surface, causing aggregate at the surface of the pavement to be lost. The pavement surface roughens as aggregate is lost, and cracks begin to form. Conventional pavement repair techniques at this stage in the deterioration process include: pouring hot rubber asphalt into the cracks, using cold patch (a polymer-modified cold mix asphalt that can be applied to a damaged road surface, e.g., placed in a pothole, under ambient temperature conditions using hand tools). Another technique for repairing pavement exhibiting minimal damage involves application of a liquid asphalt emulsion to the pavement surface so as to provide a degree of waterproofing to slow the aging process, or, for surfaces exhibiting more deterioration, application of a thin layer of a slurry of aggregate and asphalt emulsion over the top of the pavement.

Preparing and installing hot asphalt pavement involves running aggregate through a heat tube (typically at around 400° F.) where moisture is driven off to prevent boil over when the rock contacts molten asphalt. The aggregate is added to asphalt, optionally containing a rubber polymer. The aggregate is sent through a mill having high velocity tines that rolls the aggregate through a spray of asphalt. The resulting mixture of aggregate with baked-on asphalt typically comprises 95% aggregate and 5% asphalt (optionally with rubber polymer). The mixture exits the mill at about 350° F. and is transported into waiting trucks (e.g., a belly dump truck) which are driven to the job site. New pavement is laid down over an earthen base covered with gravel that has been graded and compacted. Typically, the new road is not laid in a single pass. Instead, a first 2-3 inch lift of loose hot asphalt is laid down and partially compacted, and then a second lift is laid over the first and compacted. The temperature of the asphalt concrete pavement at this stage is typically about 140° F. Additional lifts can be added as desired, e.g., to a depth of approximately 12 inches, depending upon the expected usage conditions for the road (heavy or light transportation, the velocity of traffic, desired lifetime). Primer or additional material is typically not put between layers of lift in new construction, as the fresh pavement exhibits good adherence to itself in new construction. New construction design typically never requires any primer or additional material between the subsequent lifts.

After approximately fifteen years of exposure to the elements, it becomes cost prohibitive to attempt to maintain asphalt pavement via conventional cold patching, waterproofing, and slurry techniques. The conventional approach at this stage in the deterioration of the pavement typically involves priming the damages surface and applying a layer of hot mix asphalt. For pavement too deteriorated for application priming and application of a layer of hot mix asphalt, a cold-in-place recycling process can be employed. In cold-in-place recycling, typically the topmost 2 to 5 inches of the damaged road surface are pulverized down to a specific aggregate size and mixed with an asphalt emulsion, and then re-installed to pave the same road from which the old paving material has been removed.

Existing pavement (asphalt or concrete) is typically repaired by use of an overlay, e.g., a mixture of aggregate and asphalt such as described above for new road construction. In the case of repaving over the top of rigid concrete, some type of primer is typically applied, e.g., as a spray resulting in application of approximately 10 gallons of primer per 1,000 square feet of pavement. The primer can be an asphalt emulsion that provides a tacky surface for the new overlay. A single layer of overlay can be applied, or multiple layers, typically two or more.

Cracks and stresses in a repaired underlying road bed will quickly imprint themselves on new overlays of paving material, due to the malleability of the new asphalt under rolling loads. As the underlying road bed undergoes expansion and contraction under ambient condition, cracks can be telegraphed up through as much as three inches of overlying asphalt. A conventional method for achieving some resistance to the telegraphing of old defects in the underlying road bed is to put down a hot tack coat of asphalt, lay a polypropylene mat (similar in appearance to spun-bond polypropylene, typically ¼-½ inches in thickness, available as Petromat® from Nilex, Inc. of Centennial, Co.) over the hot tack coat of asphalt, followed by a layer of new hot asphalt concrete which is then compacted over the existing surface. This will inhibit the rate of telegraphing of cracks to a limited extent, such that instead of taking place from 6 months to 2 years after repair, the cracks do not telegraph for from to 1 year to 3 years after repair. This telegraphing phenomenon by the defects in an existing aged roadbed manifest surface defects in a new pavement overlay about three times sooner than is common to a fresh asphalt concrete pavement placed on a compacted earthen and gravel base; as is the practice in new construction.

Deterioration mechanisms of new highways have been investigated over a 20 year life cycle. Overlays are typically applied between the twelfth and fifteenth year. Typically, no significant deterioration is observed over the first five years of a well-built highway. Within the first five years, cracks or potholes typically do not appear unless there is acute damage to the pavement, or loose material underneath the pavement. After the first five years, physical symptoms of deterioration are observed, including lateral and longitudinal cracks due to shrinkage of the pavement mass through the loss of binder and embrittlement of the asphalt. Cracks ultimately result in creation of a pothole. Ravelling is a mechanism wherein the effects of exposure to water and sun break down the adhesion between the rock on the top surface of the pavement and the underlying aggregate, such that small and then larger rock is released from the pavement. A stress fracture is where the pavement, for one reason or another, may not have been thick enough to withstand exposure to an extremely heavy load, moisture, or poor compaction underneath. When combined with shrinkage of the asphalt itself as it goes through heating and cooling cycles, and application of oxidative stress, stress fractures can also result. Stress fractures are characterized by extending in different directions (unlike the lateral or longitudinal cracking as described above).

The macro-texture of a pavement refers to the visible roughness of the pavement surface as a whole. The primary function of the macro-texture is to help maintain adequate skid resistance to vehicles travelling at high speeds. It also provides paths for water to escape which helps to prevent wheels of motor vehicles from hydroplaning. This optionally may be accomplished through cutting or forming grooves in existing or new pavements. Micro-textures refer to the roughness of the surface of the individual stones within the asphalt concrete pavement. It is the fine texture that occurs on chippings and other exposed parts of the surfacing. For concrete pavement this is usually the sand and fine aggregates present at the surface layer and for asphalt it is usually associated with the type of aggregates used. Micro-texture creates frictional properties for vehicles travelling at low speeds. The wet skid resistant nature of a road is dependent on the interaction of the tire and the combined macro-texture and micro-texture of the road surface.

Conventional repair of shallow surface fissures and raveling uses various methods. Re-saturants are materials that soften old asphalt. They are typically mixed with an emulsion and sprayed onto the surface of the old pavement. The material penetrates into the uppermost 20 or 30 mils of the pavement and softens the asphalt, imparting flexibility. Thermally fluidized hot asphalt can also be sprayed directly onto the surface, which hardens and provides waterproofing. A fog seal is typically sprayed on the surface, and can be provided with a sand blotter to improve the friction coefficient. In a chip seal, a rubberized emulsion can also be sprayed onto the aged pavement, and then stone is broadcast into the rubberized emulsion which then hardens, bonding the stone. Slurry seal employs a cold aggregate/asphalt mixture prepared in a pug mill and placed on the aged pavement surface, but is applied in a much thinner layer, e.g., 0.25-0.75 inches. Once the pavement surface is repaired, any safety markings can be repainted.

The Federal Highway Administration, through the National Academy of Sciences, has done research into pavement durability. A 20-year long-term paving program (LTPP) was initiated in 1984 in an attempt to understand the failure mechanisms of paving. At the end of the 20-year program and after five years of data analysis, better ways have been developed for measuring pavement failure, the most noteworthy being the Strategic Highway Research Program (SHRP) grading system. The SHRP system can be used to determine the physical qualities of an asphalt product and its potential for long-term service. Subsequently, mechanical testing was developed to determine when the ductility and flexibility of the pavement was diminished, which correlates with end of its useful life as well as the chemical changes in the asphalt itself over time were studied. The presence of carboxylates and sulfoxides that are generated over the life of the pavement cross-section was discovered to be associated with asphalt embrittlement. This discovery now enables prediction of useful life. Accelerated weathering chambers also can be employed to determine the rate of formation of these telltale carboxylates and sulfoxides in a new binder system, binder/aggregate combination, or other paving material thereby predicting an expected useful life. In terms of the chemistry of deterioration, study data indicate that asphalt pavement fails because it becomes brittle. Embrittlement leads to mass loss, which leads to shrinkage, which produces cracks. Cracks become potholes, the pavement stops flexing, and aggregate becomes dislodged.

Deterioration of asphalt binder is generally associated with asphalt beyond the first 100 microns covering the rock surface. An asphalt layer on aggregate at depths within 100 microns of the asphalt/rock interface was found by the 20 year LTDP study to have not experienced the presence of sulfoxides and carboxylates that are associated with embrittlement. Therefore the properties of that asphalt were similar to those of virgin asphalt initially placed on the rock. While not wishing to be bound by theory, it is believed that the tight bond of the asphalt within the first 100 microns of the rock surface exhibited a high degree of intimacy. This intimacy inhibits the movement of scavenging oxidizers into the asphalt structure, thereby minimizing deterioration. Accordingly, it is believed that in an aged paving material averaging 95% aggregate and 5% asphalt, a 100 micron layer of good asphalt surrounds each aggregate particle, with embrittled asphalt in between. It is this "embrittlement zone" where ductility is lost and failure takes place. Air gaps in the cross-section of the pavement can allow water and air to gain access to the asphalt rock interface. Over a period of time, the asphalt goes from being flexible to becoming brittle. The chemistries associated with the embrittlement are related to the formation of sulfoxide or hydroxyl groups, and typically there is a loss of a hydrogen atom on the carbon (oxidation) which causes the key molecular structures to become shorter, thereby less flexible. Once that happens, the pavement becomes inflexible, cracks open up, the pavement loses mass, and rolling loads break up the pavement, causing cracking, potholes, running, raveling, and block cracking, each resulting in a loss of the pavement integrity.

The conventional methods for repair of surface defects inclusive of rejuvenators and fog seals typically do not exhibit a desirable lifespan. The most durable conventional repair, a slurry seal or a chip seal, may last only 7 or 8 years. An analysis of pavement failure mechanisms provides an explanation for the poor lifespan observed for new asphalt pavement and subsequent repairs. The primary factor is that the repairs do not remedy the underlying embrittlement of the asphalt binder deep within the pavement cross-section. The embrittlement results from the scissioning of the polymer chains present in the asphalt under the influence of free radicals associated principally with water. Water penetrates the pavement, and sunlight and traffic over the pavement surface provides energy for reaction with oxygen and other pavement components, yielding sulfoxide and carboxylate reaction products and reduced polymer chain length through reaction with the resulting free radicals. Loss of polymeric molecular weight impacts the ability of the pavement to stretch and flex. A secondary failure mechanism is loss of rock itself due to hydrolytic attack of the asphalt-rock interface. Rocks typically comprise metal oxides (e.g., calcium oxide, silicon dioxide, lithium oxide, potassium oxide, sodium oxide). Hydroxide groups can form upon exposure to water, resulting in oxidative reactions that impair the adhesion of asphalt to the rock surface, a process referred to as stripping.

Loss of waterproofing typically is a top down mechanism. The asphalt breaks down from exposure to heavy load and the sun, causing water to penetrate between the asphalt and rock. The asphalt can lose its hydrophobicity, with paraffinic components being broken down into more hydrophilic components, which in turn accelerate the process of water adsorption. Ravelling occurs, resulting in a loss of macrotexture. Ultimately, the microtexture of the surface is lost due to abrasion of tires across the surface rubbing off the asphalt and polishing the rock surface, whereby the coefficient of friction drops to unacceptable levels. Typically, a brand new pavement will have a coefficient of friction of between 0.6 and 0.7. Over time, loss of microtexture and ultimately macrotexture results in the coefficient of friction dropping to below about 0.35, at which point the pavement becomes inherently unsafe in terms of steer resistance in the presence of water. Even if a pavement surface doesn't have raveling or cracking, it can still be unsafe to drive on due to loss of adequate surface texture. Microtexture and macrotexture mechanisms function at different speeds. Typically, up to about 45 mph the microtexture controls stopping distance. Between 45 and 50 the macrotexture begins to have a greater effect on stopping distance, and above 50 mph the macrotexture is the principal determining factor in stopping distance.

A method of repairing pavement utilizing electromagnetic radiation (energy) of wavelengths, e.g., of from 1-5 mm (terahertz range) is disclosed in U.S. Pat. Nos. 8,992,118, 9,169,606, 9,074,328, 9,347,187, 9,481,967, 9,127,413, 9,057,163, 9,551,114, and 9,551,117, the contents of which are hereby incorporated by reference herein in their entirety.

For example, in one method for repairing an asphalt pavement, a surface of a damaged asphalt pavement comprising aged asphalt is prepared by filling in deviations from a uniform surface plane with dry aggregate and compacting the dry aggregate; a reactive asphalt emulsion is applied to the prepared surface, whereby the reactive emulsion penetrates into cracks and crevices in the damaged asphalt pavement and into areas filled with the dry aggregate, wherein the reactive asphalt emulsion comprises butyl rubber, a diene modified asphalt, and an environmentally hardened bioresin, and wherein the reactive asphalt emulsion contains no perfluorocarbons or less than 1% perfluorocarbons as volatile components; and an emitter is passed over the prepared pavement, wherein the emitter generates electromagnetic radiation having a wavelength of from 2-5 mm the radiation penetrating into the pavement to a depth of at least 2 inches, wherein a temperature differential throughout a top two inches of pavement is 100° F. or less, wherein a highest temperature in the top two inches of pavement does not exceed 300° F., and wherein a minimum temperature in the top two inches of pavement is at least 200° F., whereby voids and interstices in the damaged pavement are disturbed without dehydrogenation of the asphalt, and whereby oligomers present in the aged asphalt are linked together into longer polymer chains, whereby ductility of the aged asphalt is improved. Useful in such methods is an emitter system comprising: a structural frame; and one or more emitter panels situated within the structural frame and pointing downward, wherein the metal frame is insulated with a layer of a high-density ceramic, wherein each emitter panel comprises a serpentine wire positioned between the high-density ceramic and a sheet of a micaceous material exhibiting biaxial birefringence, wherein each emitter panels is configured such that, in use, energy generated by each emitter panel passes through the sheet of micaceous material and impinges on an asphalt pavement, wherein each emitter panel is configured to produce energy with a power density of from 3 to 15 W/in$^2$.

In a similar method utilizing terahertz energy, a surface of a damaged asphalt pavement comprising aged asphalt is prepared by filling in deviations from a uniform surface plane with dry aggregate and compacting the dry aggregate; applying a reactive asphalt emulsion to the prepared surface, whereby the reactive emulsion penetrates into cracks and crevices in the damaged asphalt pavement and into areas filled with the dry aggregate, wherein the reactive asphalt emulsion comprises butyl rubber, a diene modified asphalt, and an environmentally hardened bioresin, and wherein the reactive asphalt emulsion contains no perfluorocarbons or less than 1% perfluorocarbons as volatile components; and an emitter is passed over the prepared pavement, wherein the emitter generates electromagnetic radiation having a wavelength of from about 2 microns to 1 millimeter, the radiation penetrating into the pavement to a depth of at least 2 inches, wherein a temperature differential throughout a top two inches of pavement is 100° F. or less, wherein a highest temperature in the top two inches of pavement does not exceed 300° F., and wherein a minimum temperature in the top two inches of pavement is at least 200° F., whereby voids and interstices in the damaged pavement are disturbed without dehydrogenation of the asphalt, and whereby oligomers present in the aged asphalt are linked together into longer polymer chains, whereby ductility of the aged asphalt is improved.

In a similar method utilizing terahertz radiation, an emitter is passed over an aged asphalt pavement, wherein the emitter generates electromagnetic radiation having a wavelength of from 20 microns to 1 mm or from 1 mm to 5 mm, the radiation penetrating into the pavement to a depth of at least 2 inches, wherein a temperature differential throughout a top two inches of pavement is 100° F. or less, wherein a highest temperature in the top two inches of pavement does not exceed 300° F., and wherein a minimum temperature in the top two inches of pavement is at least 200° F., whereby voids and interstices in the damaged pavement are disturbed without dehydrogenation of the asphalt, and whereby oligomers present in the aged asphalt are linked together into longer polymer chains, whereby ductility of the asphalt is improved; allowing the pavement to cool to below 190° F.; and a compacting roller is applied to the asphalt pavement to minimize voids and surface irregularities, wherein the asphalt is at a temperature no lower than 150° F.

An emitter unit suitable for use in generating terahertz radiation for repairing asphalt pavement can comprise at least one emitter panel, the emitter panel comprising: a frame having a high-density ceramic liner; a sheet of a micaceous material exhibiting biaxial birefringence; and a serpentine wire positioned between the high-density ceramic liner and the sheet of the micaceous material, wherein the emitter panel is configured to emit electromagnetic radiation at a wavelength of from about 2 microns to 1 millimeter and a power density of from 0.47 to 2.33 W/cm$^2$ or from 133 to 664 (fflb$_f$/min)/in$^2$.

Accordingly, there are a variety of mechanisms by which asphalt pavement can be damaged, and there are a variety of methods available for repairing damaged pavement, some of them more successful than others in preserving and extending the useful life of the pavement. It is known that for pavement that is timely and properly maintained, and repaired in the early stages of deterioration, the typical useful life can be extended out to 19 or 20 years. However, in the current economic environment, the conventional approach to road maintenance is to fix the most often travelled pavement first, and then repair, as budgets allow, progressively the better pavement, such that a useful life closer to 12 or 13 years is typically observed.

SUMMARY OF THE INVENTION

A test method and associated apparatus for determining pavement condition, especially in the context of repairing asphalt pavement, is desirable. A test method that provides data suitable for determining pavement condition and/or remaining useful life is desirable. A test that is both inexpensive and more accurate when compared to conventional techniques is also desirable.

In a first aspect, a testing apparatus for determining fatigue in a pavement sample is provided, the testing apparatus comprising: a pivoting sample plate having an upper surface and a lower surface, wherein the pivoting sample plate is supported on the lower surface by a bearing, wherein the pivoting sample plate is configured to support a pavement sample on the upper surface, and wherein the pivoting sample plate is configured to allow stress transfer to freely occur in a Y-axis direction; a floating sample plate configured support the pavement sample on an upper surface, wherein the floating sample plate is configured to freely and simultaneously move in an X-axis direction and a Y-axis direction, wherein the floating sample plate is separated from the pivoting sample plate by a gap; a trolley supporting a wheel, wherein, during a test, the wheel is configured to cycle in the X-axis direction under load on the pavement sample supported on the pivoting sample plate and the floating sample plate; and a three axis microstrain inertial sensor supported on the lower surface of the pivoting sample plate, wherein the three axis microstrain inertial sensor is configured to measure linear acceleration in the Y-axis direction and an angular rate of microstrain growth occurring within a pavement sample during the test.

In an embodiment of the first aspect, the testing apparatus further comprises a high torque variable DC motor drive configured to cycle the trolley supporting the wheel via a bell crank and a variable length tie-rod.

In an embodiment of the first aspect, the testing apparatus further comprises a floating carriage having an upper surface and a lower surface, wherein the trolley is supported on the lower surface of the floating carriage, and wherein the upper surface of the floating carriage is configured to support weights for application of load to the wheel.

In an embodiment of the first aspect, the floating carriage is supported on vertical guide rails of a frame, wherein the vertical guide rails are configured to allow the floating carriage to freely move in the Y-axis direction.

In an embodiment of the first aspect, the testing apparatus further comprises a box configured to enclose the testing apparatus, wherein the box is configured to maintain a predetermined environmental condition within the box.

In an embodiment of the first aspect, the predetermined environmental condition comprises a preselected temperature.

In an embodiment of the first aspect, the bearing supporting the pivoting sample plate or the trolley is a pillow block bearing.

In a second aspect, a method for determining fatigue performance of a pavement sample is provided, the method comprising: providing the testing apparatus of claim 1; positioning a pavement sample on the pivoting sample plate and the floating sample plate; and cycling the wheel in the X-axis direction under load on an upper surface of the pavement sample, while measuring linear acceleration in the Y-axis direction and angular rate of microstrain growth occurring within the pavement sample.

In an embodiment of the second aspect, the method further comprises maintaining the pavement sample at a preselected temperature during the cycling.

In an embodiment of the second aspect, the cycling continues until an endpoint is reached, wherein the endpoint is selected from the group consisting of an elapsed time, a threshold linear acceleration, a threshold angular rate of microstrain growth, and structural failure of the pavement sample.

DETAILED DESCRIPTION OF THE PREFERRED EMBODIMENT

Figure 1A:
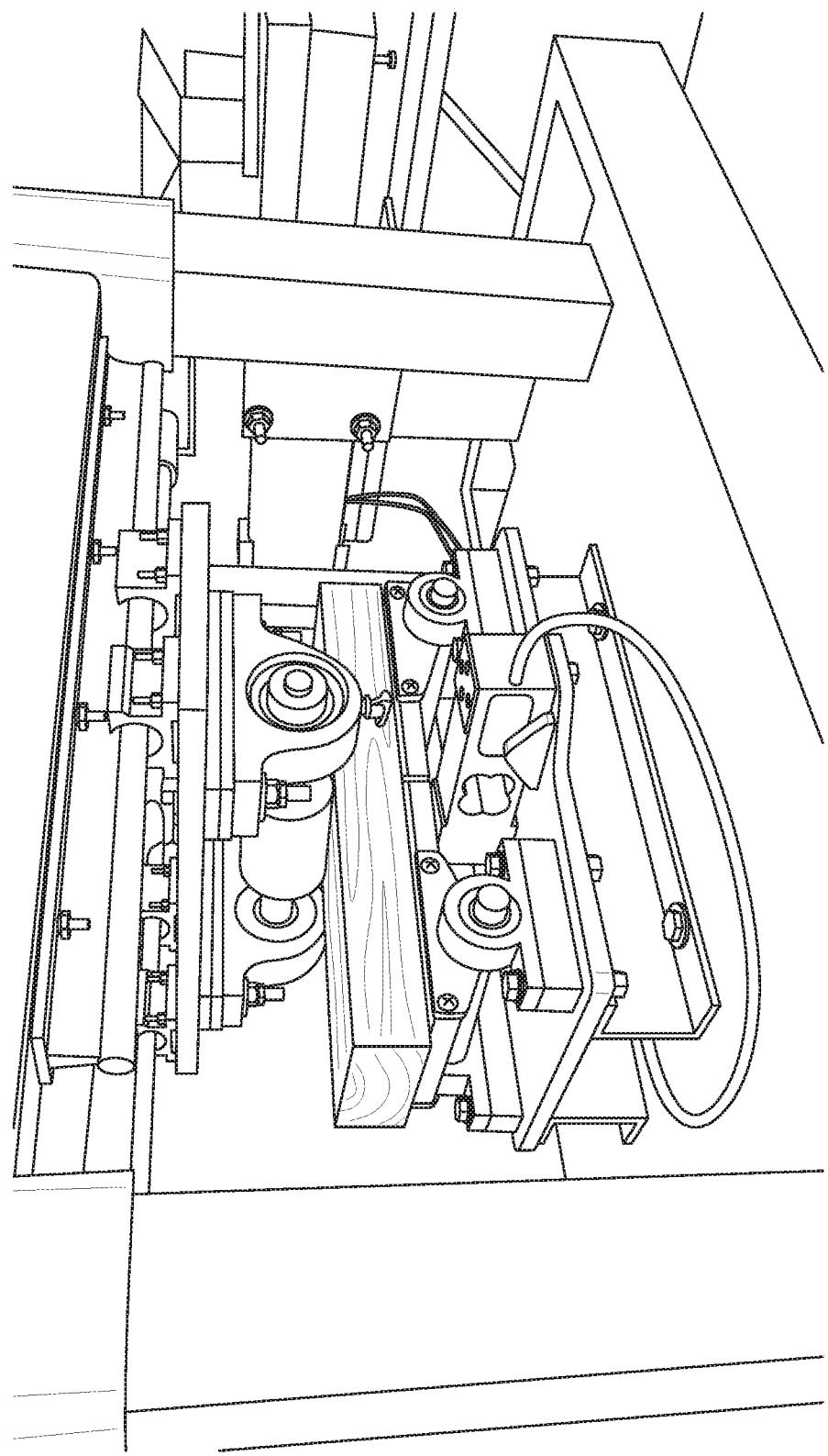
FIGS. 1A-E provide views of a strain gauge-load cell below the loading plate. In operation, the sensor is attached to a vertically-extending side of a sample of pavement to be tested. The pavement sample is epoxied to the split plate assembly holding it in the same relative position as the wood block visible in the photographs. The inertial sensors and Wheatstone bridge type sensors are strategically positioned along the side of the sample to capture various data streams critical to monitoring the build-up of unrecovered strain. In operation, the roller is positioned atop the pavement sample (represented in FIGS. 1A-E as a wood block). Load is placed on the roller, so as to press down upon the sample, and the roller moves back and forth in a horizontal plane, applying a force to the sample representative of a rolling tire under load. The sample itself is placed on a platform comprising two surfaces capable of independent motion in an up and down direction, allowing the sample to flex in a middle portion. Sensors are positioned in various locations, e.g., along one or more sides of the sample, or top or bottom of the sample, or in the sample, to obtain measurements while the roller passes back and forth over the sample.
Figure 1B:
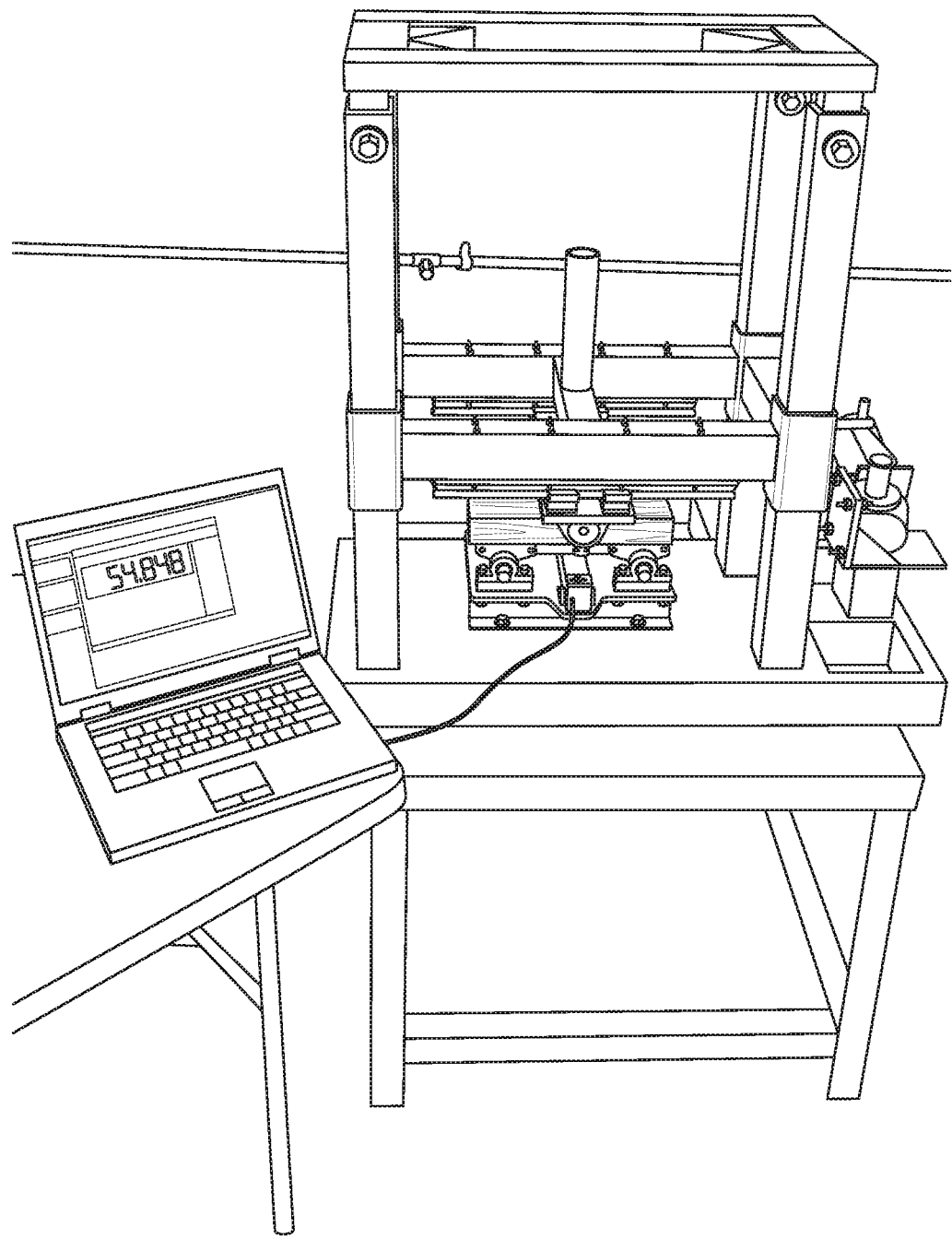
Figure 1C:
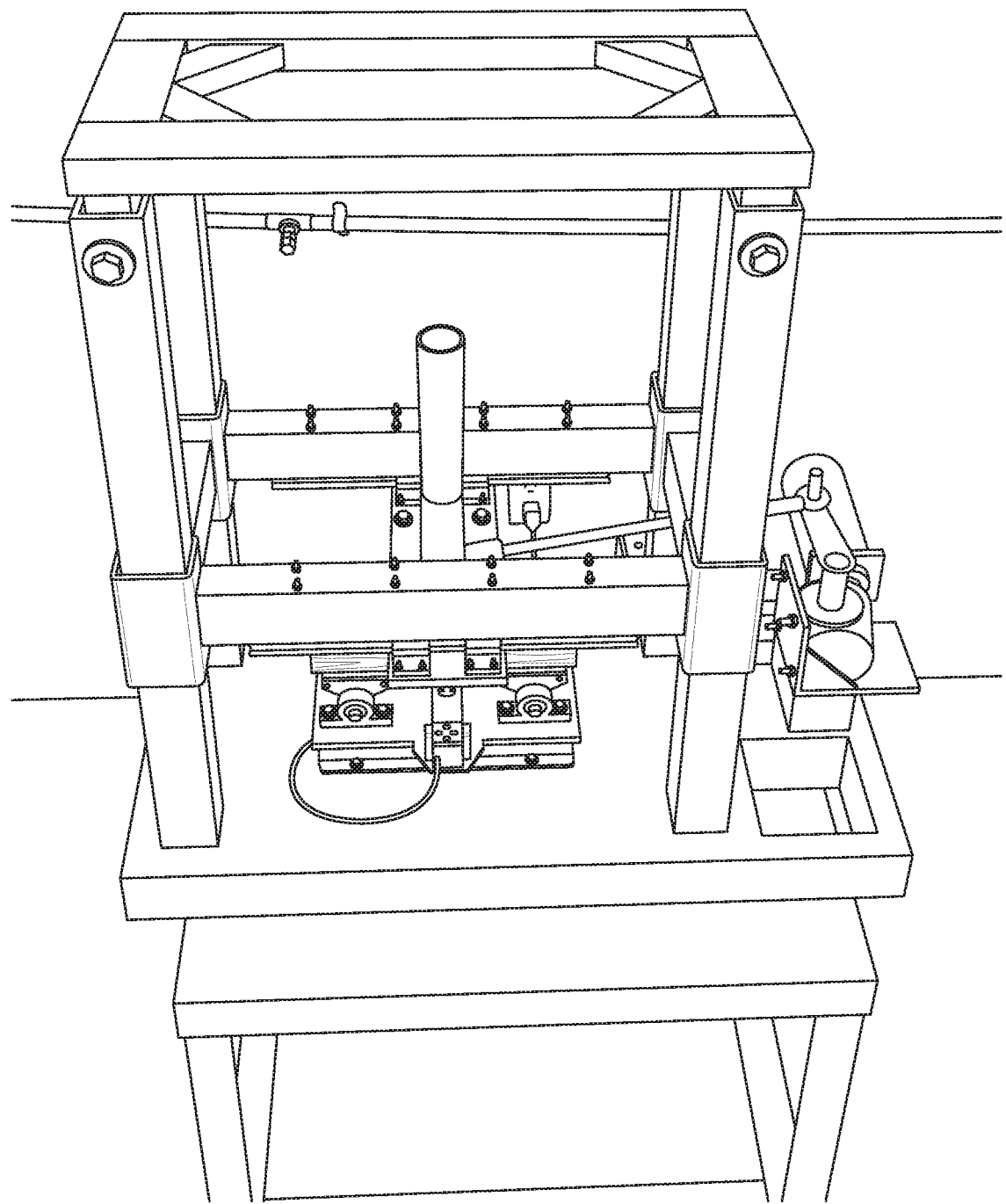
Figure 1D:
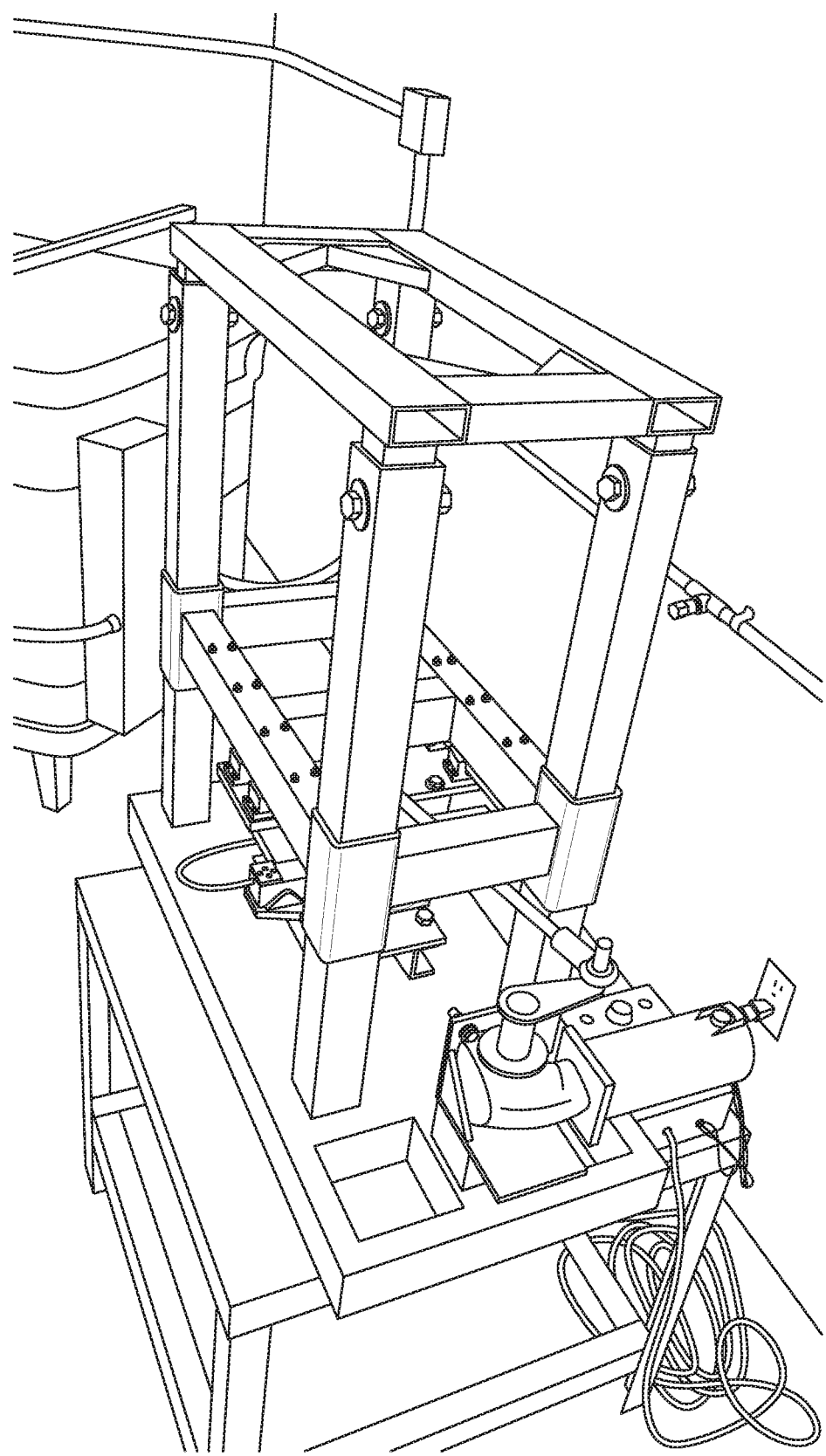
Figure 1E:
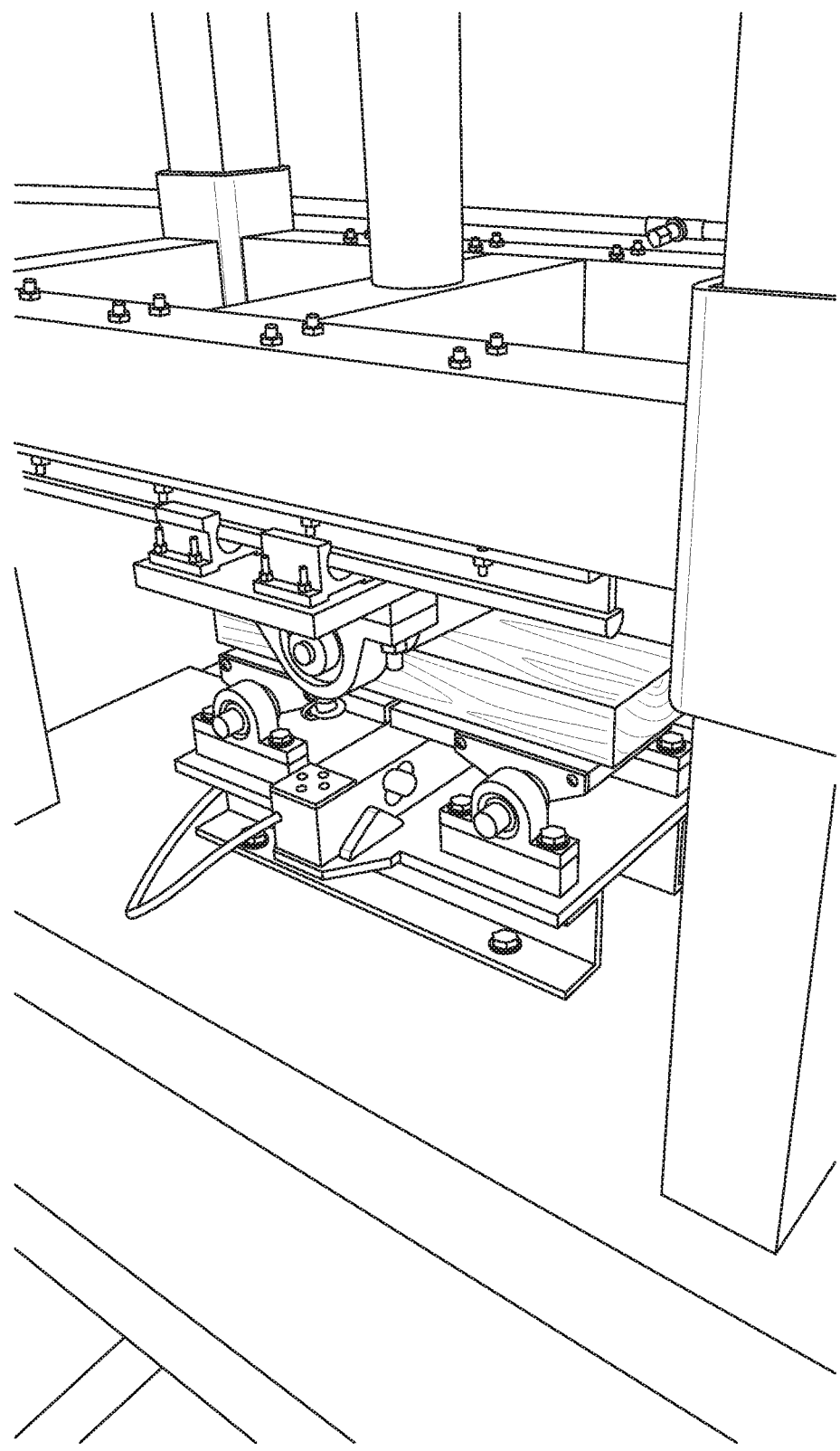

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Roads represent a unique combination of 'greats'. Great importance to civilization; great in physical presence as the civil infrastructure category with the largest mass and production energy required, by a wide margin; great cost to build and maintain and great in frustration for engineers, budget managers and suppliers who have for over 130 years been trying to figure out how to make a better road for less money. How to make our roads sustainable has been an elusive but urgent endeavor. Progress has been made over these 130 years, but the overall effort is rapidly falling behind the increased traffic and freight carrying stress associated with a growing planet.

Asphalt concrete (AC) pavement and AC roads are typically composed of stone and adhesive in a 95:5 ratio. Aggregate properties vary as does asphalt adhesive so precise laboratory blends are prepared and tested, in the lab, for specification efficacy. Once the design mix is complete a detailed specification for each of the two components is issued and exacting installation procedures are published, whereby a contractor may pursue and be paid for successfully implementing a prescribed set of standards.

Once the job is complete, traditionally the only test of final system performance is surface smoothness, air void density, grade compliance and friction conditions. Mix plant certificates are provided with each load of AC material to verify that the design mix components meet the laboratory based specification. No other performance metric is made upon the supply chain and upon payment the sponsoring agency owns the result unless the contractor has agreed to be responsible for a long term system durability standard; which is a much greater up-front expense proposition for the sponsoring agency.

Virtually no other manufactured article of such importance, in the history of our civilization, gets such a 'pass' without redundant, performance requirements being met by the manufacturer for proving that the completed article will give a long term return on the buyer's investment. By way of example, if our new automobiles only had to start and drive off the showroom floor to trigger payment from the customer, and to fully remove responsibility from manufacturer for the long term durability of, e.g., the engine, because the aluminum in the engine block had a certificate of compliance and the finished motor idled smoothly, we would all be in a mess. But that is about equivalent to what the road custodian is faced with under conventional fulfillment practices.

This is the state of our road design and construction industry; and not because the supply chain wants to see the premature failures we all experience as drivers and taxpayers. There just has not been a convenient, cost effective, predictive and reliable method to measure the broad spectrum of performance discriminators necessary to assure the long term durability of AC pavement. So in the past we all have to live with a 'best efforts' approach to testing a few conveniently accessible, external elements of the finished product; which unfortunately has not proven to be sufficient to design and build sustainable roads.

Asphalt concrete (A/C) pavement is the predominant type of material from which the driving surface of the worldwide, vehicular transportation system is composed. The other significant type of material used is Portland concrete (PC). A/C pavement is utilized on ca 93% of America's roads. A/C pavement compositions include a sieve-graded, processed aggregate and a bituminous adhesive in an approximate 95:5 mass ratio. The A/C composition may be compounded in a central hot mix plant then hauled to the construction site or in-situ compounded by portable equipment—hot or cold. Upon placement of the blended composition upon a prepared road base and into a uniform spread, it is compacted into a dense, interlocking matrix which, upon cooling and/or otherwise curing, bears rolling traffic. Worldwide there are an estimated twelve million (12,000,000) lane miles of A/C pavement.

The materials used to compound A/C pavement are prepared in accordance with many published standards. In the United States, the American Association of State Highway Transportation Officials (AASHTO) is a principal focal point for the promulgation of such published standards. AASHTO, prescriptive specifications pertaining to clean, angular, structurally tenacious aggregate blended along a nine gradation sequence known as the 0.45 Power Gradation Maximum Density Curve defines the appropriate stone. The bituminous binder is similarly specified as to composition and physical properties in accordance with Strategic Highway Research Program (SHRP) promulgated testing protocols and is referred to as a SHARP graded binder. The combination of aggregate and binder standards is known as a Superpave Mix Design.

A/C pavement as an identifiable methodology dates back to the late 1800's. It has undergone continuous innovation since its inception as the refinement of the internal combustion engine has facilitated a rapid increase in vehicular traffic which has driven the industrialization and vitality of the world's economies. Federal, state, county and city public agencies are the principal custodians for the construction and maintenance of America's road systems. Through the 1960's, a rapid expansion of the highway system in America provided vital infrastructure necessary for growth. It became apparent by the early 1970's, however, that the road systems of America had become non-sustainable by available budgets. Two emerging realities led to this tipping point: 1) low cost of aggregate and significant increases in production and placement costs for asphalt binder; and 2) a heavy-truck and traffic-accelerated rate of failure of the A/C pavement surfaces to an unsafe condition.

The most vigorous study performed since the early 1900's of the failure mechanisms associated with the design and elements of America's road systems began with the Long-Term Pavement Performance (LTPP) program in 1984. The (LTPP) program was established to collect pavement performance data as one of the major research areas of the Strategic Highway Research Program (SHRP). The first five years of the LTPP program were completed under the funding and direction of SHRP. Since 1991, the Federal Highway Administration (FHWA) has continued the management and funding of the program. The LTPP effort includes two fundamental classes of studies and several smaller studies to investigate specific pavement related details that are critical to pavement performance. The fundamental classes of study are the General Pavement Study (GPS) and Specific Pavement Studies (SPS). The combined GPS and SPS programs consist of over 2,500 test sections located on in-service highways throughout North America. The LTPP program will monitor and collect pavement performance data on all active sites. The collected data include information on seven modules: Inventory, Maintenance, Monitoring (Deflection, Distress, and Profile), Rehabilitation, Materials Testing, Traffic and Climate.

Due to the enormous size and importance of the pavement infrastructure to the safety and competitiveness of the nation's economy, state and local agencies, as well, have significant ongoing parallel programs of data collection, testing and failure analysis. It has become axiomatic that A/C pavement fails in three general categories: I, Cracking; II, Displacement; and III, Mass Loss. Understanding the mechanism(s) behind these three categories has led to the persistent development of methods to analyze collected data and therefrom innovate advanced designs and materials which would mitigate early and/or premature pavement failure at an improved cost-benefit ratio.

Such innovation is expected to move road system maintenance and construction back from the fiscal tipping point, such that sustainability, within current budgets may be achieved. Fatigue Cracking Failure Analysis Fatigue cracking in A/C pavement may be viewed as the result of stress from thermal forces or rolling mechanical forces. Cracking is un-recoverable strain resulting from a stress acting upon the composite structure.

Fatigue cracking of A/C pavements is considered to be one of the most challenging issue facing pavement engineers today. The cause of these cracks, which are influenced by repeated (e.g., cyclic) loading over time can be tied to weak pavement foundations, insufficient designed asphalt materials, or changes in strain tolerance of the mixture brought on by long-term aging. Fatigue cracks propagate through the structure. The end result of cracks is water intrusion, rougher ride quality, reduced fuel efficiency and traffic congestion during rehabilitation work. Cold temperature causes stone and bitumen composites to contract, putting stress upon the most ductile element—the binder. If the binder lacks sufficient properties to deform during the cold cycle it will snap, forming a micro-fissure (e.g., a breach). Bituminous (asphalt) binders are thermoplastic and may, upon re-warming, flow and 'heal' the breach, or they may not. When they do not, such micro-fissures begin to permanently form and couple into larger breaches which will, over time, appear as visible cracks in the A/C pavement. At the other extreme, warm temperatures will cause A/C pavement to expand. In compression, the pavement may heave into peaks, which places a bending stress on the bituminous binder. Should the physical properties of the binder be too stiff, a condition usually due to severe oxidation, then micro fissures will form, causing an un-healable breach which immediately becomes the beginning of a crack. With the above-described thermally induced stresses, a second, often more formidable compounding force will result in cracking of A/C pavement—the bending deflection caused by the rolling load(s) of vehicular traffic.

While thermal stresses repeat on roughly one to twelve hour cycles (depending upon the movement of cloud cover versus sunny conditions versus seasonal variations), A/C pavement stress due to the deflection caused by rolling loads may be as frequent as every few seconds. Dependent upon the mass and velocity moving over the A/C pavement surface, this type of stress can be expected to induce an exponential increase in un-recoverable strain. Devising A/C pavement design mixes and materials which will substantially reduce un-recoverable strain requires an improved method of data gathering about physical and mechanically induced fatigue. Current laboratory methods are described in Walubita et al. "THE OVERLAY TESTER (OT): COMPARISON WITH OTHER CRACK TEST METHODS AND RECOMMENDATIONS FOR SURROGATE CRACK TESTS", Report No. FHWA/TX-13/0-6607-2, published August 2013, which compares all primary, current methods utilized in Mechanical Induced Fatigue Testing (MIFT). All primary, current methods are built around the use of a "punching load", which is measured as a dimensional change by one or multiple-point but individual, two-axis, linear variable differential transducers (LVDT). However, vehicular traffic dynamic loading characteristics, for the most part, are not kangaroo-like. Therefore the two-axis data gathered by such conventional means provides a less than authentic similitude of the real-world dynamic, which, by reason, creates a sub-optimal data stream upon which to establish decisions for better designs and materials.

Critical data gathered from rolling fatigue loads on bridge deck evaluations has repeatedly verified that static, "punching loads" versus rolling, dynamic loads produce remarkably different stress-strain relationships in the structures; in particular along the longitudinal and transverse axis. See, e.g., Cho et al., "Fatigue Performance of Precast FRP-Concrete Composite Deck with Long Span", Engineering, Vol. 3, No. 11, Nov. 24, 2011; and Connor et al., "Bridge Deck Design Criteria and Testing Procedures", FINAL REPORT, Prepared for NCHRP Transportation Research Board of The National Academies, Project No. 10-72, July 2012.

Developing similar data from A/C pavement cross sections by constructing equipment and developing a test method which measures one point or multiple but interlinked, triaxial stress-strain relationships, provides a substantially fresh data stream about the actual behavior and performance characteristics of A/C pavement designs and materials. It is expected that this more authentic data stream will lead to the rapid development of meaningful innovations which will produce a better result in the mission critical, cost:benefit calculus for the construction and maintenance of the worldwide vehicular transportation network.

A Fatigue Performance Test has been developed which gives rapid, cost effective and accurate insight as to pavement performance. The Fatigue Performance Test achieves this using STIC Technology which is 'next generation', aerospace flight hardware fatigue analysis science and engineering.

The Fatigue Performance Test device provides a never-before available, on-the-spot method to quickly and precisely analyze how and why a pavement structure fails, what useful life may be expected and give clear guidance and exact navigation as to how to re-design and build the pavement to gain significantly better durability; all in a more cost effective manner. This flow of quality information will give budget managers and engineers the tools needed to better provide safe, long lasting roads, within budget.

Once the most cost effective design model is established, the Fatigue Performance Test platform may be site-deployed in a small portable lab module, to validate a full suite of accelerated tests on sampling taken from the completed road paving installation with sufficient speed and cost effective results to keep the material supplier and contractor effort at the level of excellence necessary to assure that the design performance and the finished product performance correlate.

The Fatigue Performance Test, utilizing STIC Technology, provides the new tool, so missing in the pavement design and construction value proposition, to assure sustainability.

STIC (Space Time Inertial Correlation) Technology provides a system-responsive, integrated, binary process for inducing and measuring, time-weighted encounter dynamics. The encounter may be mass-on-mass, energy-on-energy or mass-on-energy. Facilitating the encounter is a custom configured, load simulator device which induces stressors into the selected mechanical and/or biological systems which are analogous to the real world experience those systems encounter in their normative environment. Simultaneous monitoring of intra and inter deviations from a pre-established, baseline metric within the system elements is achieved by a carefully tuned 'forest' of advanced micro-electronic devices.

The micro-electronics consist of high speed, precision, time-synchronized, giga-bit digital data acquisition sensors and advanced signal processing. This is inclusive of strategically placed; triaxial, inertial tracking probes and a range of Wheatstone bridge-type sensors including strain gauges, accelerometers, pressure transducers, torque sensors, load cells and magnetometers.

Embedded firmware supports an open-architecture command structure that enables control of sensor gain, offsets and shunt calibration. Data streams from the encounter dynamic, upon tuning, are processed by programmable, 'system-health' algorithms which monitor performance, pinpoint and calculate evolving, unrecovered strain and predict vital outcomes such as remaining useful life and potentially damaging events.

By measuring pavement properties, improvements in safety, system design, maintenance scheduling and life cycle cost can be achieved through thin slicing, real-time examination of system dynamic performance under stress.

The Fatigue Performance Test platform is derived from advanced STIC aerospace science and engineering. The Fatigue Performance Test induces a traffic analogous, 60 cycle, stress-strain environment into a road pavement cross section through a rolling cyclic fatigue platform. Data from the encounter dynamic will reveal, with pinpoint accuracy, where strain build-up is occurring well before external, visually detectable evidence of fatigue failure is present in the pavement sample from cracks or permanent deformation. Responsive tuning of the embedded, sensor firmware establishes a baseline status for the sample whereupon incoming data gathered during the stress-strain encounter dynamic will reveal such important factors, for example, as to whether fatigue build-up is: 1) occurring at the surface of the sample or deep within, or 2) failure rate is adhesive related versus stone nesting and/or 3) rate of failure under persistent but numerically greater cyclic, lighter rolling loads associated car traffic are more significant as compared to much heavier loads such as those associated with truck axle loading.

Once the rate and nature of the fatigue failure is establish, design mix changes can be made and retested to achieve better cost benefit ratios from a fixed option matrix of pavement elements. With the Fatigue Performance Test this reduction or elimination of guess work as to the best road material design and construction method, will facilitate much more robust highway durability at the most value effective, installation costs.

No field-applicable method to prove the long term, fatigue performance of installed, "thin lift" pavement cross-sections (new or old) has heretofore been promulgated. Current state-of-art for such a performance test is a machine called an AMP Tester (Asphalt Materials Performance) which can be purchased for ~$90K and which has an accessory faculty to perform thin lift cross-sections. The AMP Tester's prominent feature is the capacity to perform dynamic modulus testing on pavement design mixes composed of thickness of a minimum of 6". This is the test that FHWA counts on for validation of deep cross-section, road reconstruction. The AMP, thin-lift-accessory apparatus performs the test as a sophisticated stress-strain, single point, 'punching' load that simulates a 40 year old test developed by Texas DOT (Texas Overlay Test: Tex 248-F). However, after years of concerted development it has a coefficient of variation no better than 40%, an undesirable level of performance predictability.

In contrast, the Fatigue Performance Test as provided herein simulates the actual load characteristics of a loaded, rolling tire and it can be performed from a blank sawn from field pavement cores, at a reasonable price. The Fatigue Performance test can certify pavement as of better quality after repair (via before and after testing, or comparison of test data after repair to a control, e.g., virgin asphalt pavement).

Test Platform

The test platform incorporates design features that help to closely replicate real-world rolling wheel loads on asphalt pavement roads. Existing testing methods such as the Texas Overlay Test are unable to produce predictive performance stress-strain data due to their constrained testing designs. Simulating the stress-strain relationship of an actual rolling traffic environment requires both a free floating rolling load and a sample bed that is allowed to naturally deflect and recover as it would in an actual road. The test platform takes these naturally occurring variables into consideration so that they can be reproduced on a laboratory scale test to help correlate actual field performance data.

Figure 2:
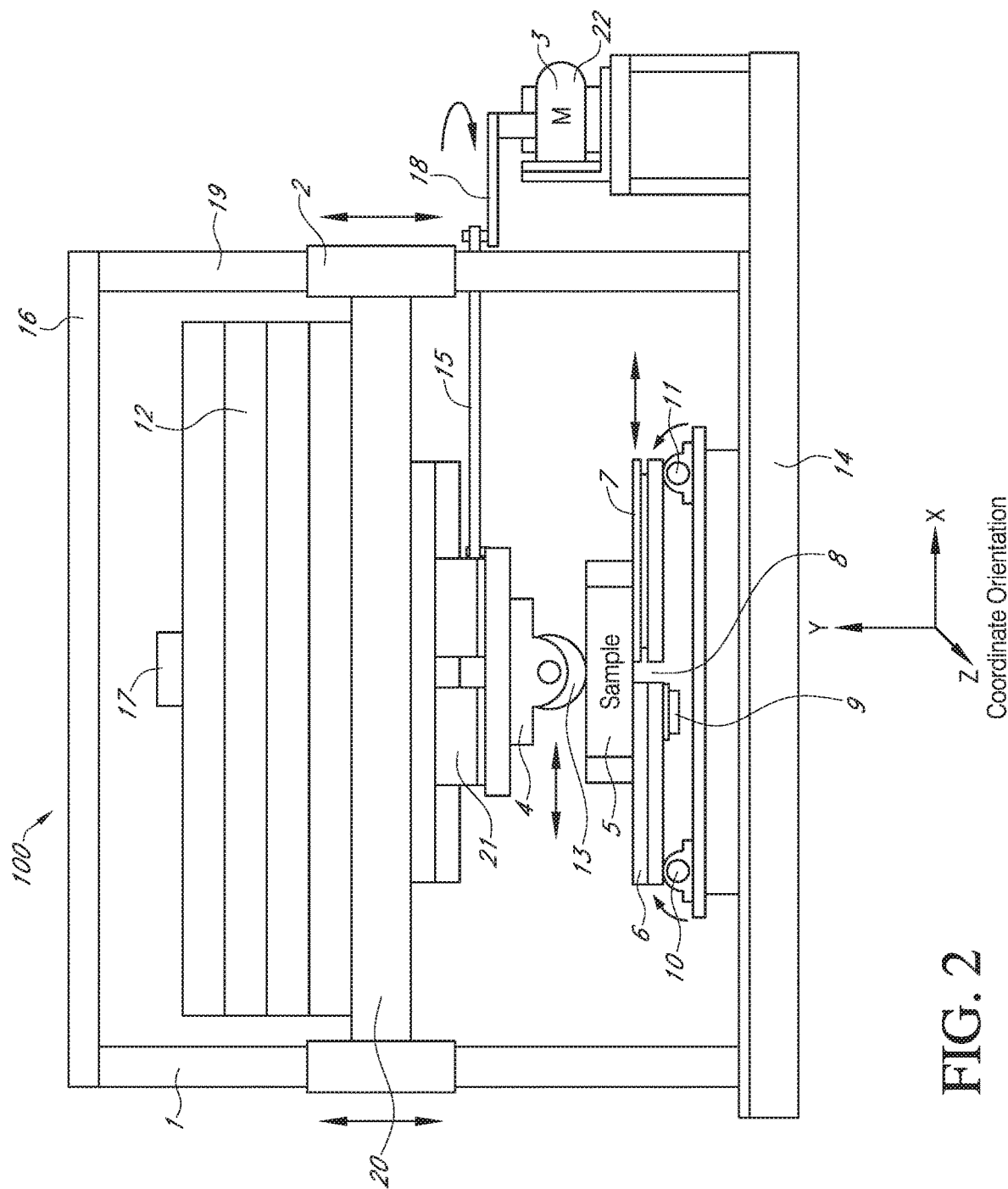
FIG. 2 is a schematic diagram of a Stress Transfer Aspect Ratio Rolling Fatigue Test Platform ("test platform").

FIG. 2 depicts a test platform 100 of an embodiment. The test platform includes:
  1. Main Frame and Vertical Guide Rails
  2. Fully Floating Weighted Carriage with Precision Bearing Blocks
  3. Variable Speed Motor, Gearbox, Bell Crank, and Control
  4. Low Friction Trolley with 3 inch Diameter Wheel
  5. 6 inch by 1.5 inch Asphalt Pavement Core Sample
  6. Pivoting Sample Plate
  7. Floating Sample Plate
  8. Sample Plate Gap
  9. Three Axis Microstrain Inertial Sensor The main frame including a horizontal rail 16, vertical guide rails 1, 19, and a base 14. The main frame supports a fully floating weighted carriage 20, 2 with precision bearing blocks 21. The weighted carriage 20 supports one or more weights 12, e.g., a weight stack wherein the weights are in plate form, each plate having a predetermined weight and a hole in the center (not depicted) which fits over a pipe 17. The base 14 supports a variable speed motor 22, gearbox (not depicted), bell crank 18, tie rod 15, and control (not depicted). A low friction trolley with wheel 13 is supported beneath the carriage 20. The wheel 13 rests on the sample 5 to be tested, which is in turn supported by a first or pivoting sample plate 6 and a second or floating sample plate 7. The pivoting sample plate 6 and the floating sample plate 7 are separated by a gap (sample plate gap 8), and supported by pillow block bearings 10, 11. A three axis microstrain inertial sensor 9 is situated beneath the pivoting sample plate 6.

Main Frame & Vertical Guiderails

The main frame can be advantageously constructed using a heavy gauge steel design with a 10× service factor to ensure a rigid structure that supports the high weight rolling loads. The frame includes four lubricated vertical guide rails, allowing the floating weighted carriage to freely move in the Y-axis. While heavy gauge steel is advantageously employed, any other material suitable for fabrication into a supporting member can also be used, e.g., polymers, fiberglass, wood, ceramic, composites, or the like. While four guiderails can advantageously be employed, as few as a single guide rail, two guide rails, or any other number of guiderails can be employed. The guide rails can be of any suitable configuration as is known in the art of linear motion rails. In one configuration, the guide rail is a simple cylindrical pipe, with the bearing blocks each comprising a larger diameter cylindrical pipe positioned in a concentric configuration to slide along the Y-axis over the guide rail. In another configuration, the guide rail has a circular, square or rectangular cross section, with the bearing blocks having a complimentary U-shaped profile partially fitting over the guide rail. The bearing blocks can optionally include wheels, cams, roller bearings, or ball bearings configured to engage with the guide rail or a form of lubrication (e.g., graphite, bearing grease, a teflon layer, or the like) to minimize friction.

Floating Weighted Carriage

The floating weighted carriage utilizes low friction adjustable precision bearing blocks at each corner to allow the rolling load to travel unrestricted over sample irregularities as it cycles. This freedom to float in the vertical direction comes into play as the sample begins to fatigue and deform, thus providing a constant wheel loading all the way through to ultimate sample failure. The weights stacked on the floating carriage can be of any suitable form. One or more metal plates of predetermined weight can be conveniently employed. In an alternative design, a weight or weight stack is located on each side of the carriage, so as to bring the weight stack in line with the center of gravity (or wheel axis), thus eliminating or reducing torque moments about the center of gravity, and thereby eliminating any potential binding. Alternatively, a weight or weight stack can be secured to the bottom of the carriage.

Variable Speed Motor and Driveline

A high torque variable DC motor drive and control allows for a smooth, robust and versatile testing configuration. The bell crank and a variable length tie-rod allow the test platform to accommodate a variety of sample sizes and permit adjustment of the sample plate gap, discussed below.

Low Friction Wheel Trolley

The wheel trolley includes a rigid steel chassis mounted to precision self-lubricating pillow block bearings that provide a smooth low friction track for the wheel trolley to cycle in the X-axis. The chassis of the wheel trolley can also accommodate a variety of wheel sizes and materials which attach to precision pillow block bearings for smooth low friction support. This provides flexibility as to testing parameters, e.g., the wheel footprint can be changed to reflect a specific traffic environment of interest (e.g. equivalent passenger tire loadings, commercial truck tire loadings, etc.). In one embodiment, the wheel is configured with a 2 inch outer diameter, a 3 inch width, and a 0.5 inch inner diameter. In this embodiment, the wheel is fabricated from polyurethane with a tensile strength of 60A (medium hard). Other configurations are contemplated, e.g., a wheel outer diameter from 1 inch or less to 4 inches or more (e.g., 5, 6, 7, 8, 9, 10 11, or 12", or diameters duplicative of any passenger car tire diameter, or commercial vehicle tire diameter). Wheel widths of from 2 inches or less (e.g., 1 inch) to 6 inches or more (e.g., 7, 8, 9, 10, 11, or 12 inches, or widths duplicative of any passenger car tire diameter, or commercial vehicle tire diameter 2-6". Wheel hardnesses of from Shore A 10 or less to Shore A 100 or more are contemplated, e.g., from 20, 30, 40, or 50 Shore A up to 60, 70, 80, 90, or 100 Shore A. Wheels having a smooth tread surface are contemplated, as are wheels having one or more grooves or protrusions or a tread pattern (e.g., duplicative of passenger car or commercial vehicle tire tread).

Pavement Core Sample

The test platform allows pavement sample from a wide variety of sources to be tested. Sources include typical 6-8 inch diameter core field samples to laboratory compacted samples (e.g., asphalt concrete samples subjected to the Marshall compaction method). Typical sample dimensions are 6 inches long by 3 inches wide by 1.5 inches thick. A test platform as depicted in FIGS. 1A-E can accommodate sample sizes of from 4 inches to 10 inches long, 2 inches to 6 inches wide, and 0.5 inches to 6 inches thick. The test platform can be sized to accommodate other sample dimensions, if desired. While the typical sample dimensions set forth above are generally advantageous to employ, in certain embodiments the sample size may be modified to account for the age, origin and mix design of the sample, as well as the performance variables of interest (load modulus, bending quality, hot/cold/extreme temperature bending, etc.).

Pivoting Sample Plate

The pivoting sample plate is designed to provide a platform to adhere the test sample in a manner so as to eliminate potential load transferring aid to the sample while it holds the sample in place. The pillow block pivot points allow stress transfer to freely occur in the Y-axis as the sample begins to fatigue. The sample is fixed to the pivoting sample plate by a two-part epoxy adhesive that covers an underside portion of the sample that comes into contact with the two plates. JB Weld or any other common two-part epoxy adhesive can be employed. In alternative designs, the sample is affixed to the plate by other adhesive systems, or mechanical fixing means, e.g., clamps, bolts, etc.

Floating Sample Plate

The floating sample plate allows the sample to freely and simultaneously move in the X-axis and Y-axis during testing. As the sample begins to fatigue, the level of internal micro-strains increases. This results in a dimensional change (i.e. unrecoverable strain) of the sample, which must be accommodated for on a continuous basis. The floating sample plate design allows for this dimensional change without providing load transferring aid to the sample. The sample is fixed to the floating sample plate by a two-part epoxy adhesive that covers an underside portion of the sample that comes into contact with the two plates. JB Weld or any other common two-part epoxy adhesive can be employed. In alternative designs, the sample is affixed to the plate by other adhesive systems (e.g., methacrylate adhesive systems), or mechanical fixing means (e.g., clamps, bolts, etc.).

Sample Plate Gap

The distance between the two sample plates (the sample plate gap) is a variable that can be customized to accommodate a testing design of interest. Customizing the distance of the sample plate gap allows the operator the freedom to change the 'loading zone' of the sample to a specific cross-sectional area. This feature of the test platform allows the testing of a broad range of pavement mix designs. In certain embodiments, the floating sample plate can abut the pivoting sample plate, such that no gap is present. In other embodiments, the gap can be adjusted to a suitable range for the sample of interest In the test platform of FIGS. 1A-E, the tester adjusts the plate gap from 0 inches to 1.5 inches; however, typical testing of samples is done with a gap of from 0.5 inches to 1 inches. The test platform can be readily modified to accommodate a gap of up to 6 inches or more. The gap is adjusted by way of the pillow-block bearings that the plates are attached to. Each bearing is attached to the baseplate (which is part of the mainframe's base) with bolts and the baseplate itself has 'oblong' bolt hole guides that allow the bearings to travel on the X axis, thereby adjusting the plate gap. By lengthening of the oblong bolt holes, larger gaps can be accommodated.

Three Axis Microstrain Inertial Sensor

Miniature tactical grade microstrain inertial sensors, as are used in high value flight hardware such as load bearing wing spars and propeller shafts of aircraft to measure inertial forces, can be employed in the testing platform. For example, a LORD MicroStrain sensor (Part No. 3DM-GX4-25, available from LORD Corporation, Williston, Vt.) has the ability to simultaneously measure microstrain displacements on three axes within the test sample at rate of up to 4 kHz. In addition, the sensor can measure in real-time both the linear acceleration and angular rate of microstrain growth occurring within a sample during the test. Together, these measurements provide a valuable stream of data that characterizes the stress-strain dynamics within a test sample as it is subject to a repetition of rolling loads. The individual data streams, not just the various streams in parallel, can provide insight towards characterizing the internal microstrain dynamics within the sample. By observing patterns in the data for control samples (either virgin pavement, or samples that have been aged under a particular set of conditions, e.g., high temperature, low temperature, wide temperature swings, water exposure, pavement compositions), possible failure mechanisms in other samples can be identified by comparison. Three axis data is valuable for determining certain failure mechanisms. For example if a soft binder slips so as to create forces (on all three axes) on the aggregate in a way to make the aggregate fail first, this feature can be identified. The three axis data enables the tester to observe these microstrains develop, so as to avoid mischaracterization of the failure mechanism (binder failure versus failure of the aggregate). The tester can employ the test platform to determine patterns with regard to the interworking relationships of the individual components of the pavement by way of the data streams when pattern recognition and data are developed together. An advantage of the test platform is that a sample can be tested and data gathered within about 2 hours to 4 hours, thus providing rapid turnaround of sample analysis and generation of information within a single business day in certain embodiments, unlike conventional pavement testing methodologies. In other embodiments, an 'accelerated test' can be conducted over a longer period of time to simulate a much slower fatigue rate. Both approaches to testing provide valuable information regarding pavement properties. For typical pavement samples, test conditions of 200-4000 cycles (a full pass of the wheel from one side of the sample to the other and back) at 80-100 psi can be employed to produce useful test results within a single day. This gives a reasonable data point for mix design decisions within a reasonable timeframe.

Figure 3:
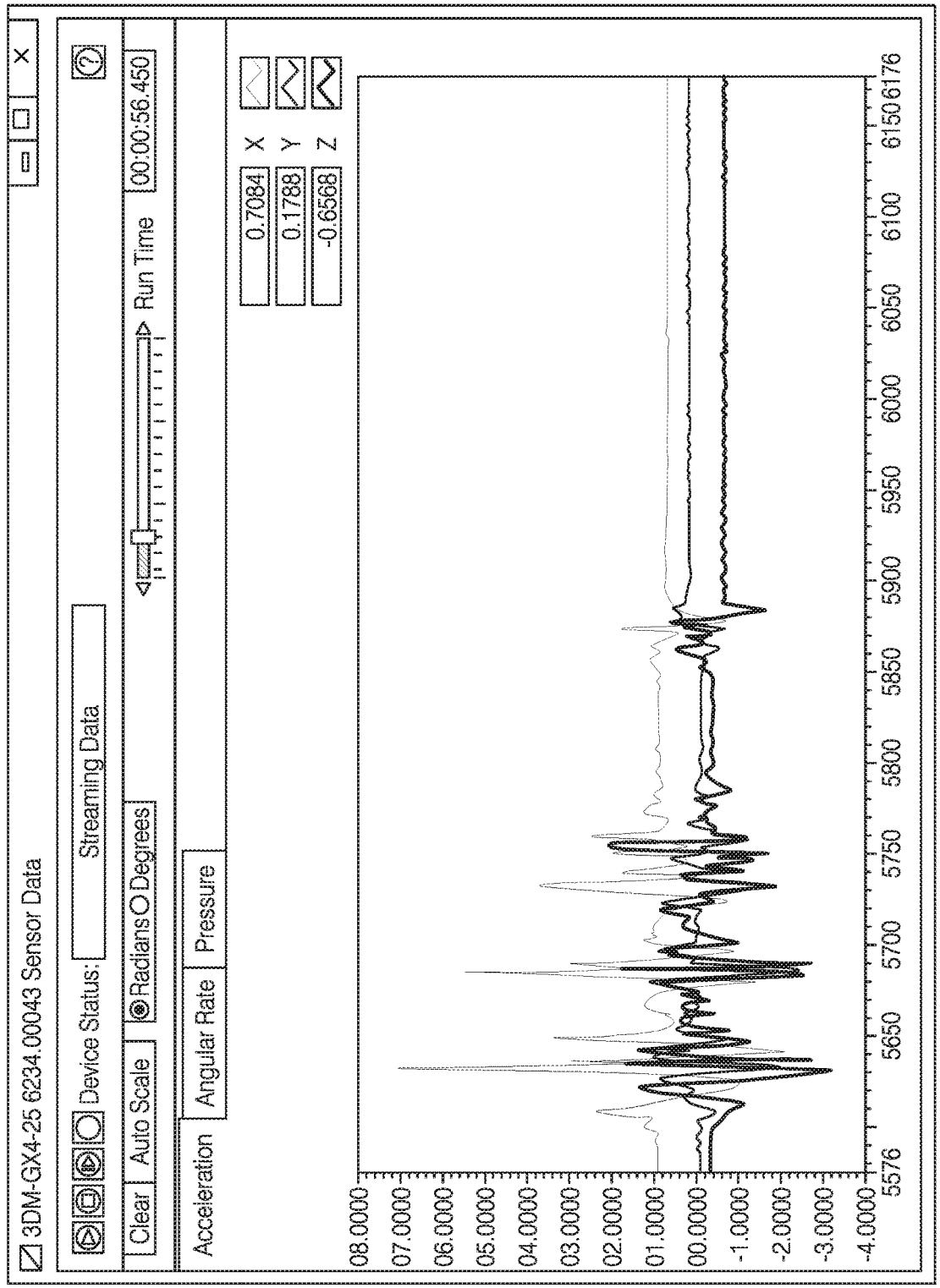
FIG. 3 is a screen shot of sensor data acquisition during a test.

A typical test run starts with the linking of the microstrain sensor to the software interface to establish baseline data points. Once a constant low-noise signal can be acquired, the test and data recording can be started simultaneously. During the testing phase, the software control panel can display both a graph and absolute values, in real-time, of the individual axis values with a resolution of <0.01° (see, e.g., FIG. 3). The test platform software can save the data thus obtained in memory, and can perform automated analysis to determine whether or not the sample possesses the desired attributes.

If the study of pavement behavior in specific climate environments is of interest, then variable temperature environments can be accommodated with the use of a closed box environment. A box, e.g., a Plexiglas box, can be provided to enclose the test platform. The box can be connected to a heater to provide elevated temperatures (e.g., from above ambient, e.g., 20° C., up to a temperature of 30° C., 40° C., 50° C., 60° C., 70° C., 80° C., or even higher (e.g., 85° C. or more). The elevated temperature can be selected based on a highest recorded temperature for a given locale where a pavement is already installed or to be installed, or can be an average high temperature for the year for that locale. The box can be connected to an air conditioner or other source of chilled air to provide depressed temperatures (e.g., from below ambient, e.g., 20° C., down to a temperature of 10° C., 0° C., −10° C., −20° C., −30° C., −40° C., −50° C., −60° C., −70° C., −80° C., −90° C., or even lower (e.g., −100° C., or more). The depressed temperature can be selected based on a lowest recorded temperature for a given locale where a pavement is already installed or to be installed, or can be an average low temperature for the year for that locale. Temperature can be measured using a thermometer or a thermocouple. A thermostat can provide temperature control. In certain embodiments, it may be desirable conduct a test using a particular temperature profile, e.g., to simulate the natural heating and cooling cycles observed for an outdoors locale over time. A programmable thermostat can provide a predetermined temperature cycle for the duration of testing.

Other environmental aspects can be duplicated, e.g., providing humidified air (0% humidity up to 100% humidity), or liquid water to simulate rain or standing water, e.g., using a water hose with nozzle, optionally with a flowmeter, to dispense water to the sample at a desired rate and in a desired form, or a waterproof enclosure for the test apparatus to simulate submerged pavement, e.g., in salt or brackish water. Conditions of irradiation can also be provided, e.g., IR, visible, or UV radiation or other radiation that pavement can be exposed to.

Test Procedure

A sample of asphalt pavement is obtained. The sample can be removed from an existing paved surface (e.g., by coring or cutting), or can be freshly prepared from an aggregate (e.g., virgin stone, recycled asphalt pavement, recycled concrete, sand, etc.) and an asphalt binder. The sample is sized to fit the testing platform, as discussed above. The sample is affixed using two-part epoxy adhesive to the pivoting sample plate and the floating sample plate, leaving a gap between the sample plates. The floating carriage is then lowered into position such that the wheel rests atop the sample. Weights are added to the top of the floating carriage until the desired load is reached. The motor drive is engaged, causing the wheel to roll back and forth atop the sample along the X-axis. The speed at which the wheel moves (cycles per minute) is controlled by the motor drive, and is selected to replicate repetitive rolling loads (typically a constant 0.25-1 cycles per second; however, faster or slower cycle rates can be employed, e.g., 0.1, 0.15, or 0.2 or less to 1.5, 2.0, 2.5, or 3 or more cycles per second). Slow rolling heavy loads typically create early failure in pavement cross-sections, as opposed to fast loads. Accordingly, a rate less than 1 cycle per second can be desirable to model slow rolling heavy loads (e.g., 0.9, 0.8, 0.7, 0.6, 0.5, 0.4, 0.3, 0.2, or 0.1 cycles per second or less). If a particular environmental profile (other than ambient) is desired, the test platform is enclosed in a box and appropriate temperature and/or humidity/water profile is provided.

At the beginning of the test run, a baseline is established, then the test is allowed to run until an endpoint is reached. The endpoint can be a preselected duration of time, an occurrence of exceeding a threshold strain value, an occurrence of exceeding a threshold displacement value, a failure of the sample (cracking, separation, decomposition, or the like). A generally useful test parameter is one that equate to 1.5 ESALs. An ESAL (Equivalent Single Axle Loading) is a reference axle load of 18,000 lbs, single axle with dual tires. For example, 1.5 ESALs is the highest loading, which is the axle of a city bus.

In certain embodiments, behavior of a pavement sample is compared to one or more controls, or behavior of two or more pavement samples are compared to against each other. The behavior of sample(s) and control(s) subjected to identical test conditions is determined. Controls can include any other pavement that exhibits benchmark behavior to be met or exceeded. A control useful in the context of road paving applications is virgin asphalt pavement prepared using a standard hot mix method, this pavement being representative of freshly installed pavement employed in roads in the United States and elsewhere. Behavior of the sample can be compared to that of the control to determine whether the sample is expected to exhibit similar behavior to the control, inferior performance to the control, or superior performance to the control. This methodology enables samples prepared using different processes or from different materials to be readily compared to conventional paving materials, thereby vetting new processes and materials for use in roads or other applications.

Another test methodology involves testing identically prepared samples under different environmental conditions and comparing the behavior. This methodology enables a particular pavement to be evaluated for suitability for use under specific environmental conditions, e.g., ability to tolerate wide temperature swings, ability to provide acceptable performance at high temperatures, ability to provide acceptable performance at low temperatures, ability to tolerate moisture, or any other combination of ambient conditions.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A testing apparatus for determining fatigue in a pavement sample, the testing apparatus comprising:
    a first sample plate having an upper surface and a lower surface, wherein the first sample plate is supported on the lower surface by a bearing, wherein the first sample plate is configured to support a pavement sample on the upper surface, and wherein the first sample plate is configured to allow stress transfer to freely occur in a Y-axis direction;
    a second sample plate configured to support the pavement sample on an upper surface, wherein the second sample plate is configured to freely and simultaneously move in an X-axis direction and a Y-axis direction;
    a roller configured to cycle in the X-axis direction under load on the pavement sample supported on the first sample plate and the second sample plate; and
    a three axis microstrain inertial sensor supported on the lower surface of the first sample plate, wherein the three axis microstrain inertial sensor is configured to measure linear acceleration in the Y-axis direction and an angular rate of microstrain growth occurring within a pavement sample while the roller cycles in the X-axis direction.

2. The testing apparatus of claim 1, further comprising a high torque variable DC motor drive configured to cycle the roller via a bell crank and a variable length tie-rod.

3. The testing apparatus of claim 1, further comprising a carriage having an upper surface and a lower surface, wherein the roller is supported on the lower surface of the carriage, and wherein the upper surface of the carriage is configured to support weights for application of load to the roller.

4. The testing apparatus of claim 3, wherein the carriage is supported on vertical guide rails of a frame, wherein the vertical guide rails are configured to allow the carriage to freely move in the Y-axis direction.

5. The testing apparatus of claim 1, further comprising a box configured to enclose the testing apparatus, wherein the box is configured to maintain a predetermined environmental condition within the box.

6. The testing apparatus of claim 3, wherein the predetermined environmental condition comprises a preselected temperature.

7. The testing apparatus of claim 1, wherein the bearing supporting the first sample plate is a pillow block bearing.

8. A method for determining fatigue performance of a pavement sample, the method comprising:
    providing the testing apparatus of claim 1;
    positioning a pavement sample on the first sample plate and the second sample plate; and
    cycling the roller in the X-axis direction under load on an upper surface of the pavement sample, while measuring linear acceleration in the Y-axis direction and angular rate of microstrain growth occurring within the pavement sample.

9. The method of claim 8, further comprising maintaining the pavement sample at a preselected temperature during the cycling.

10. The method of claim 8, wherein the cycling continues until an endpoint is reached, wherein the endpoint is selected from the group consisting of an elapsed time, a threshold linear acceleration, a threshold angular rate of microstrain growth, and structural failure of the pavement sample.

* * * * *